US006411314B1

(12) United States Patent
Hansen et al.

(10) Patent No.: US 6,411,314 B1
(45) Date of Patent: Jun. 25, 2002

(54) SYSTEM AND METHOD FOR REPRESENTING AND CONTROLLING A PRODUCTION PRINTING WORKFLOW

(75) Inventors: David R. Hansen, Honeoye Falls; Robert K. Holzwarth, Palmyra, both of NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/573,026

(22) Filed: May 17, 2000

(51) Int. Cl.$^7$ .............................. G06F 3/00; G06F 3/12
(52) U.S. Cl. ..................... 345/769; 345/835; 707/526; 707/529; 358/1.15; 358/1.16
(58) Field of Search ................................. 345/339, 348, 345/356, 349, 764, 835, 769; 707/514, 515, 526, 512, 529; 358/1.15, 1.16, 1.18

(56) References Cited

U.S. PATENT DOCUMENTS

| | | | |
|---|---|---|---|
| 5,699,494 A | | 12/1997 | Colbert et al. ............... 395/114 |
| 5,718,520 A | * | 2/1998 | Mackay ........................ 400/61 |
| 5,760,775 A | * | 6/1998 | Sklut et al. .................. 345/349 |
| 5,946,461 A | | 8/1999 | Landry et al. ............... 395/117 |
| 5,978,559 A | * | 11/1999 | Quinion ....................... 395/114 |
| 6,026,258 A | | 2/2000 | Fresk et al. ................... 399/87 |
| 6,046,818 A | * | 4/2000 | Benson ....................... 358/1.18 |
| 6,134,568 A | | 10/2000 | Tonkin ........................ 707/526 |
| 6,213,652 B1 | * | 4/2001 | Suzuki et al. ............... 395/114 |

OTHER PUBLICATIONS

Manual, "Adobe® Portable Document Formal Reference Manual, Version 1.3," pp. 2–518, Mar. 11, 1999.
"Adobe® Acrobat 4.0 Guide," pp. 1–595, No Date.
Brochure, "Quite Imposing Plus Online Guide 1.2", No Date.
Brochure, "W3C Extensible Markup Language (SML) 1.0," W3C Recommendation Feb. 10, 1998, pp. 1–32.
Brochure, "StampPDF™ Users Guide—An Acrobat Plugin," pp. 6–82, ©1999 Digital Applications, Inc.
Brochure, "TIFF™ Revision 6.0" Specification, pp. 4–120, Jun. 3, 1992.
Manual, "TWAIN Specification Version 1.8," pp. 1–516, Oct. 22, 1998.
Manual, "Open Document Management API, Version 2.0," pp. 1–87, Sep. 19, 1997.
Brochure Guide, "Network Imaging System Interface Development Guide, Release 2," pp. 1–1–6.4, Feb. 2000.
Dan Phelps and John Thompson, "Rendering For Electronic Printers and Copiers," pp. 1–72, Sep. 29, 1992.
Kodak Publication No. FN9074 5/85—"Fundamentals of Digital Copiers—Revision 1," pp. 1–49.

* cited by examiner

Primary Examiner—Raymond J. Bayerl
Assistant Examiner—Cuong T. Thai

(57) ABSTRACT

A system and method for managing production printing workflow is disclosed. The system includes workflow management software which manages and facilitates the procedural stages of the workflow including job origination, job preparation, job submission and job fulfillment. The workflow management software provides an integrated object oriented interface which visually reflects and interacts with the workflow.

63 Claims, 8 Drawing Sheets

400

Desktop Application

- Provides visual production printing management
- HDi designed application integrated with Acrobat
- Desktop application manages "Desktop Objects"
  - Documents
  - Print Tickets
  - Books
  - Jobs
- Acrobat manages/edits PDF objects from Desktop
- Dialogs manage/edit other Desktop Objects

FIG. 4a

SYSTEM AND METHOD FOR REPRESENTING AND CONTROLLING A PRODUCTION PRINTING WORKFLOW

RELATED APPLICATIONS

The following co-pending and commonly assigned U.S. Patent Application has been filed on the same date as the present application. This application relates to and further describes other aspects of the embodiments disclosed in the present application and is herein incorporated by reference.

U.S. patent application Ser. No. 09/573,113, "AUTOMATED JOB CREATION FOR JOB PREPARATION", filed concurrently herewith.

BACKGROUND

While just about every computer user owns their own printer and is capable of producing high quality documents, the ability to produce such documents in high volume and with special finishing features, such as binding, is still within the purview of the commercial print shops and corporate copy departments. High volume, finished production of documents is typically referred to as production printing. A production printer is a printing device capable of rapid production of large volumes of documents. Typically these printers have high paper handling capacity, the ability to draw on multiple media types from multiple sources and the ability to automatically finish a document such as by adding a binding. Despite the automation provided by the production printer and the proliferation of computer technology, especially in the area of desktop publishing, production printing is still a complicated and often manual process.

In a typical print shop, customers bring in original documents which they want turned into a finished product such as a bound booklet, a tri-fold brochure or a tabbed three ring bound notebook. In addition, they typically need a large volume of the finished product, for example, one thousand brochures. The combination of the original documents plus the instructions for producing the finished product is called a "job". The documents can be brought in either in hard copy or electronic form, such as on floppy disk, compact disc or tape or can be transmitted to the print shop over a network such as the Internet.

After handing over the documents to the clerk, the customer relays his instructions for preparing the finished product. The clerk will note these instructions on a "ticket" or "job ticket". The job ticket is typically a piece of paper with all of the instructions written on it for producing the finished product. As mentioned above, this is known as job. The job will then be handed to an operator, who runs the production printer, to produce the finished output. The operator's job is to prepare the document for production, load the appropriate materials, such as paper stock and binding materials, into the production printer and ensure that the finished output is correct.

While the job of the operator seems simple, there are many issues which quickly complicate it. Often, the documents provided by a customer are not ready to be run on the production printer. Some documents provided by a customer are merely raw manuscripts requiring basic formatting, such as margins, typography, etc. Other documents may be formatted but such formatting might not take into account the requested binding. For example, the text of the document is too close to the margin, therefore, when the finished product is bound, some of the text will be obscured. Some documents, such as books, require special care so that, for example, the first page of every chapter appears on the front of a page, also known as imposition. Other forms of imposition include booklet/pamphlet imposition or n-up imposition. Or the customer may bring in multiple documents and ask that these "chapters" be assembled into a book, with a cover and binding.

Other issues which complicate the production printing job are determining and loading the correct media into the production printer. Often, jobs will require many different paper types, such as different stock weights or different colors. In addition, some jobs require the insertion of tab stock at specific points within the document. Still other jobs may require the adding of a bates number or other annotation to the document.

With such a complicated production process to produce finished output, errors are bound to occur, such as loading the wrong paper stock in the printer or setting a margin too close to a binding. Production printers run at very high speeds, often producing output greater than 1 page per second therefore, errors in the finished output may not be caught before a significant amount of time and resources have been wasted.

Accordingly, there is a need for an efficient system and method for managing the production printing workflow.

SUMMARY

The present invention is defined by the following claims, and nothing in this section should be taken as a limitation on those claims. By way of introduction, the preferred embodiments described below relate to an interface, implemented in a computer, for representing and controlling a production printing workflow. The interface comprises: a display; a first document object representing a document where the document further comprises content and formatting, the formatting defining at least one page in the document, the first document object being associated with a first visual representation on the display; a document ticket object representing global document attributes, the document ticket object being associated with a second visual representation on the display and capable of being associated with the first document object; a page object representing a page attribute of one of the pages, the page object being associated with a third visual representation on the display and capable of being associated with the first document object; and a first user input device for selectively associating at least two of the first, second and third visual representations. In the interface, association of the first, second and third visual representations results in association of their respective objects.

The preferred embodiments further relate to a method of controlling a production printing workflow. The method comprises: displaying a first visual representation of a document on a display; displaying a second visual representation of global document attributes capable of being associated with the document on the display; selectively associating the first visual representation with the second visual representation; and based on any associations made, linking the global document attributes with the document such that the global document attributes apply to the document.

DETAILED DESCRIPTION OF THE PRESENTLY PREFERRED EMBODIMENTS

Figure 1A:
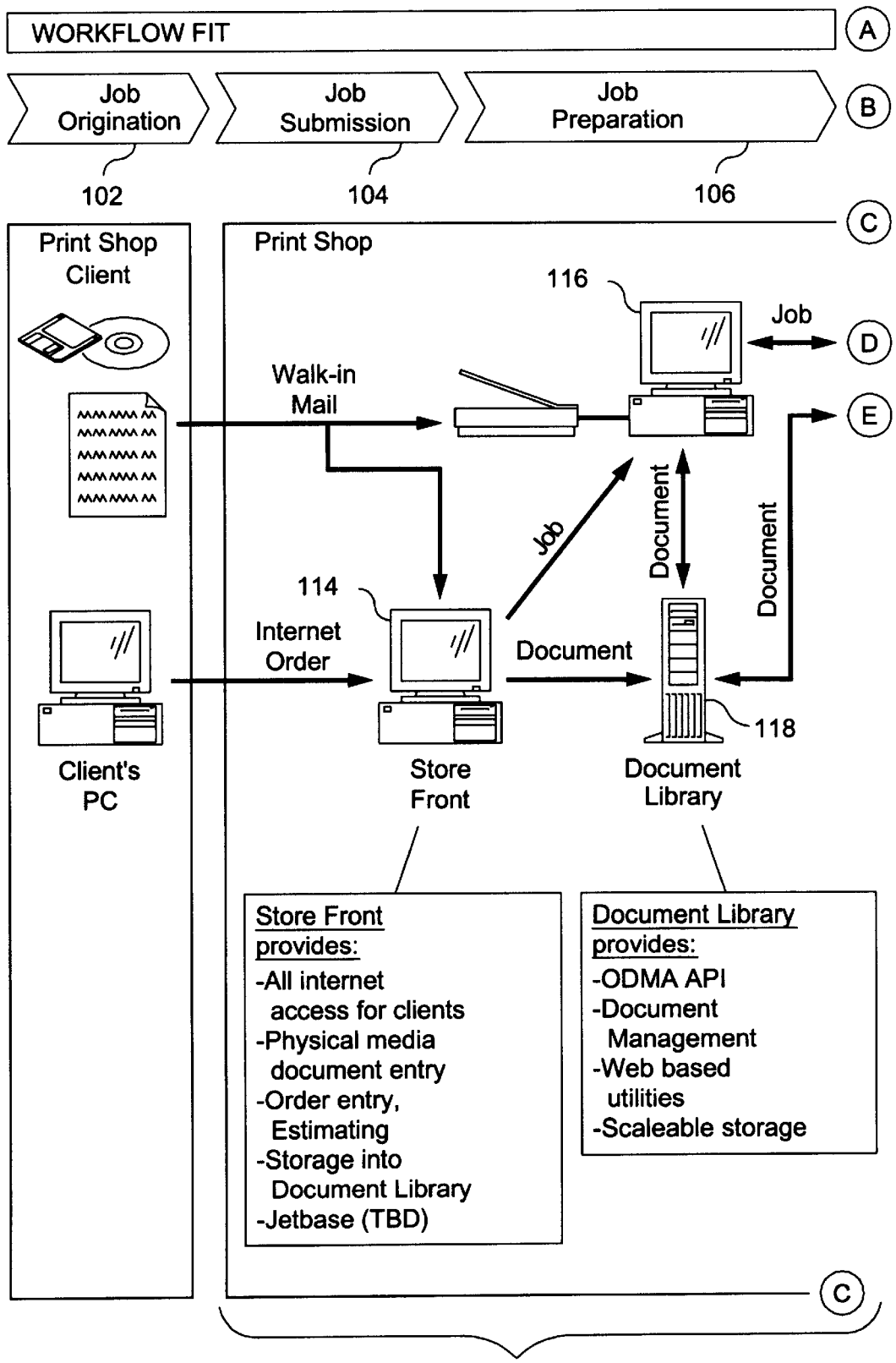
FIG. 1 depicts a flow diagram illustrating a preferred production printing workflow.
Figure 1B:
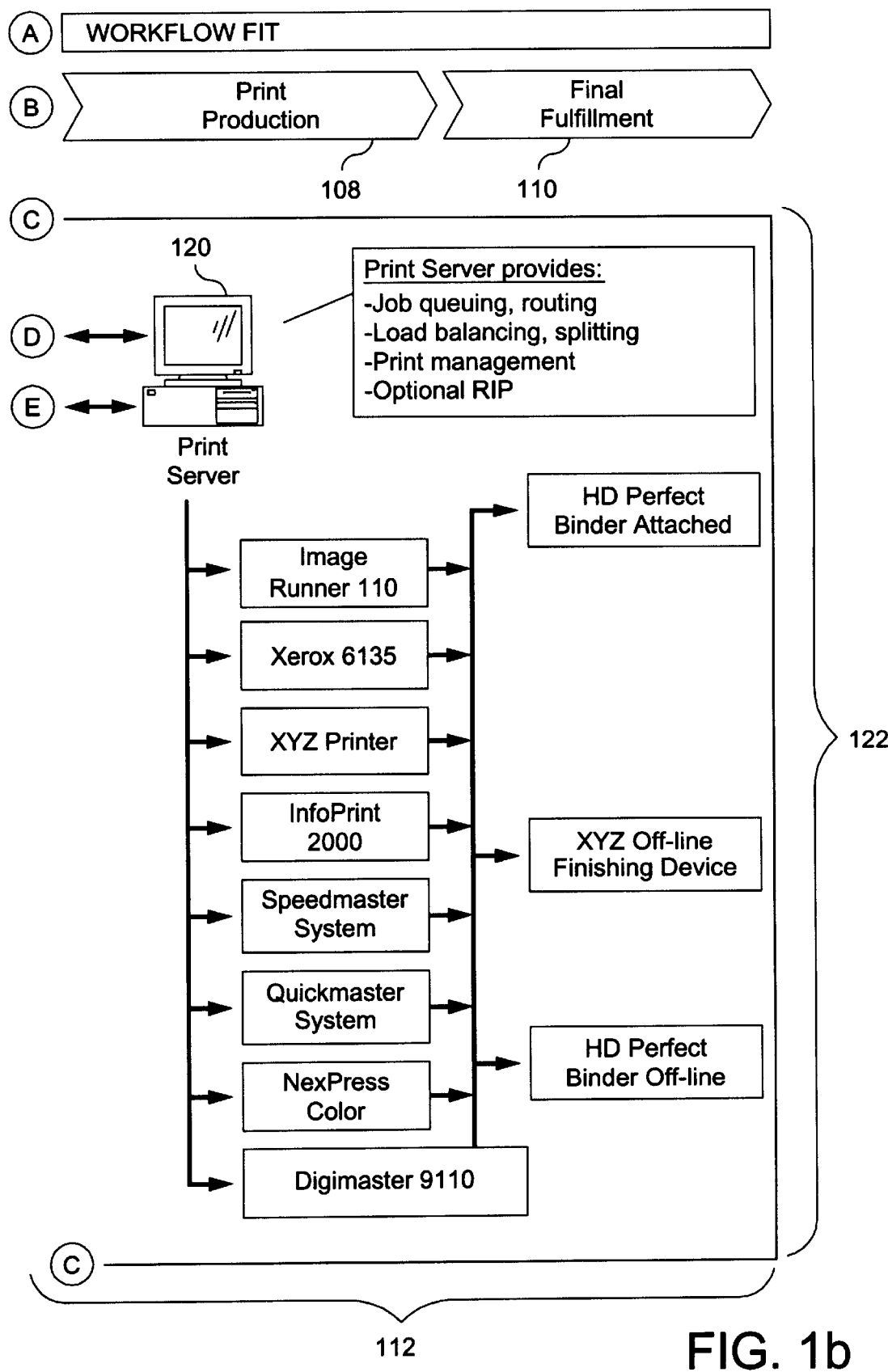

Referring now to FIG. 1, there is shown a flow diagram illustrating the production work flow 100 in a typical production print shop such as a commercial high volume copy or print shop. A workflow is defined as the tasks, procedural steps, organizations or people involved, required input and output information, and tools needed for each step in a business process. As will be discussed below, a workflow approach to analyzing and managing a business or process such as production printing can be combined with an object oriented approach, which tends to focus on the discrete objects and processes involved such as documents, pages, data and databases. For the purposes of this disclosure, the term "object oriented", when applied to the disclosed embodiments, does not imply that an object oriented programming approach is the only method of implementation of the disclosed embodiments.

FIG. 1 further depicts a typical computer network 112 for use in a print shop. In a typical digital print shop, there will be a network 112 of computer work stations 114, 116, servers 118, 120 and high volume output devices 122 which make up the computer network 112. The servers 118, 120 include network servers 118 and print servers 120. The topology of the network 112 is typically structured so as to align with the workflow 100 of the print shop. The network 112 may be implemented as a wired or wireless Ethernet network or other form or local area network. Further the network 112 may include wired or wireless connections to wide area networks such as the Internet and connections to other local area networks such as through a virtual private network.

The production workflow 100 includes the procedural stages of job origination 102, job submission 104, job preparation 106, print production 108 and final fulfillment 110. Alternatively, one or more of these procedural stages may be combined as well as there may be other additional procedural stages. Job origination 102 is the procedural stage of receiving the documents and instructions, which together are defined as a "job", from the customer. Job origination 102 can occur when a customer physically brings his job, whether in hard copy or electronic form, to the print shop or otherwise transmits the job to the print shop, whether by phone, fax, postal mail, electronic mail or over a local area or wide area network such as over the Internet. Note that a job may contain more than one document and more than one set of instructions. For example, a job may contain many documents, each being one chapter of a book, along with a document containing a cover for the book. This exemplary job may include the instructions for producing the body of the book from the individual chapter documents and another set of instructions for producing the cover. In addition, as will be discussed below, there may be a third set of instructions for assembling the cover to the body of the book.

Job submission 104 is the receipt of the job by the print shop and the entering of the job into the print shops production system or workflow. Typically the instructions from the customer will be written down on a special form, known as a "ticket" or "job ticket". A ticket may also be electronically created and maintained. Furthermore, pre-defined tickets may be available for standardized instructions. For example, the shop may have a pad of pre-printed tickets with the instructions to duplicate the documents, three hole punch the final output and assemble the punched final output in a three ring binder. If this is a common request by customers, such pre-printed tickets can save time and resources. All the order taking clerk need do is fill in any customer specific details such as the number of copies to produce. Pre-defined tickets may help to standardize operations and prevent errors in the transcription of instructions from the customer. In very simple print shops, job submission 104 may simply be the receiving of the original documents and instructions along with the creation of a ticket, placing the job in a paper folder and setting it in a physical queue for later handling in subsequent procedural stages.

In print shops which handle jobs electronically, job submission 104 requires entering the job into the shops electronic production system. For documents which are brought in by the customer as hard copy, the documents must first be scanned electronically into he shop's computer system. For documents delivered in electronic form, the document data files must be loaded on the shop's computer system.

For the job submission stage 104, the computer network 112 will include one or more "store front" workstations 114. The store front workstations 114 are computer systems placed at the order taking desk, at a manned clerk's station or set out for customer self service use. These workstations 114 are used for the job submission stage 104 and typically will be configured to handle many different electronic media types such as floppy disk, compact disc, tape, etc. These stations 114 may also be configured to receive jobs over the Internet or other form of network connection with customers. Further, these workstations 114 are typically configured to read many different electronic file formats such as those used by the Microsoft Office™ family of products manufactured by Microsoft Corporation, located in Redmond, Wash. or various other desktop publishing program file formats such as Aldus Pagemaker™ or QuarkXpress™. In addition, these stations 114 can also read "ready for printer" file formats, which will be discussed later, such as Portable Document Format™ ("PDF"), Postscript™ ("PS") or printer control language ("PCL"). Job preparation stations 114 can also accept image formats such as Tagged Image File Format ("TIFF"), bitmap ("BMP") and PCX. These stations 114 may also include a scanner 116 for scanning hard copies of documents into the computer system. Scanners typically are complicated devices to operate and some print shops may prefer to locate the scanners in the job preparation stage 106 for use solely by trained personnel as will be discussed below. In addition, the store front computers 114 also provide the ability to generate a ticket, electronically or in hard copy form, for the job containing all of the instructions for completing the production printing task. This process of generating the ticket may be automated, involving pre-defined tickets, manual or a combination thereof, and is discussed in more detail below.

Job preparation 106 involves preparing the documents for printing according to the instructions in the ticket. For documents that are submitted in hard copy form, job preparation 106 may include scanning the documents and creating a faithful and error free electronic reproduction. The documents, once in electronic form, must also be distilled down or converted into a common file format that the print shop can use to both edit and print the documents. This alleviates the need for operators to deal with multiple different programs and eliminates the need to assemble complex documents together for printing using different electronic file formats.

For example, a customer may bring in two different documents, one being the body of a book and the other being the photographs to be inserted at specific pages. The customer may then instruct that the photographs be inserted at particular pages and that the final assembly have continuous page numbers added. The body of the book may be in Microsoft Word™ format while the images of the photographs are in Adobe Photoshop™ format. While the operator could figure out at which pages the images will be inserted and appropriately number the pages of the book and photographs using each individual software package, this is a very complex and time consuming process. It also requires that the operator be trained and familiar with a range of software packages and runs the risk that he will not be familiar with the particular package that the customer used. Therefore, it is more efficient to distill each of the various file formats into a unified format which allows the operator to prepare the job using a single software interface. In the preferred embodiments, all documents, whether provided in hard copy or electronically, are distilled or converted into a "ready for printer" or "print ready" file format. In the preferred embodiments, the Portable Document Format™ is used as the ready for printer format, developed by Adobe Systems, Inc., located in San Jose, Calif.

A ready for printer file format is defined as a file format which contains both the data to be printed along with printer control instructions that can be directly interpreted by the internal processing engine of a printer or other form of hard copy output device in order to rasterize the data image onto the output media. Rasterization is the placement of image data at a specific location on the output media. Such file formats include Portable Document Format™ ("PDF") and Postscript™ ("PS") both manufactured by Adobe Systems, Inc., located in San Jose, Calif., as well as printer control language ("PCL"), manufactured by Hewlett Packard, located in Palo Alto, Calif. Examples of non-ready for printer formats include the native application file formats for personal computer application programs such as Microsoft Word™. These file formats must be first converted to a ready for printer file format before they can be printed. Furthermore, some image file formats, such as the Tagged Image File Format ("TIFF") contain bit image data only which is already in a format which specifies its output location on the output media and does not contain printer control instructions for interpretation by the internal processing engine of the printer and therefore, for the purposes of this disclosure, is not a ready for printer file format. By using a ready for printer format, rasterization of the image data can be delayed as close as possible to the final placement of the image data on the output media. This allows the most efficient use of the production print device 122 by allowing its internal control logic to optimize the rasterization process resulting in output that is more likely to match with the operator's expectations.

For the job preparation stage 106, the computer network 106 includes job preparation stations 116 and network servers 118 coupled with the store front workstations 114 over the network 112. Herein, the phrase "coupled with" is defined to mean directly connected to or indirectly connected with through one or more intermediate components. Such intermediate components may include both hardware and software based components. The job preparation stations 116 preferably execute workflow management software, described in more detail below, which allows the operator to manage, edit and print jobs. The network server (s) 118 includes a document library which allows manipulation, management, storage and archiving of jobs, or just there respective documents and/or tickets, as well as facilitates and manages the flow of jobs from the store front computers 114 to the job preparation stations 116 and from the job preparation stations 116 to the print servers 120 or the production output devices 122. Exemplary document libraries include Intra.DOc™ document management system manufactured by Intranet Solutions, Inc., located in Eden Prairie, Minn. and the DOCFusion document management system manufactured by Hummingbird, Inc., located in York, Ontario, Canada. In the preferred embodiment, the job preparation stations 116 are lmagesmart™ Workstations, manufactured by Heidelberg Digital, L.L.C., located in Rochester, N.Y. Alternatively, an appropriate computer hardware platform such as that comprising a Pentium™ class processor or better, manufactured by Intel Corporation, located in Santa Clara, Calif., 64 megabytes of RAM or more, a 20 gigabyte hard disk or larger and appropriate display device may be used. Further, in the preferred embodiment, the network servers 118 preferably comply with the Open Document Management Architecture ("ODMA") standard and provide document management capabilities and scaleable storage.

The job preparation workstations 116 also provide the capability of the print shop to add value to the print production process by offering services to the customer. Such services include the ability to modify documents provided by the customer to add features that the customer could not or would not add himself. Such features include adding page numbers across multiple documents, bates numbering, adjusting page layout for tab stock and aligning the output to account for binding. Further the job preparation stations 114 provide the capability to fix errors in the documents such as removing artifacts in scanned images and masking over unwanted text or markings. The job preparation stations 114 can also be used to prevent inaccuracies in the finished output caused by the printing or binding process. Such inaccuracies include binder's creep which happens after a document is imposed into a booklet/pamphlet using a signature imposition. Binder's creep occurs when the placement of the images on the paper fails to account for the thickness of the binding as a function of the number of pages in the book causing the image on the pages to shift inward as you get closer to the cover. Binder's creep is prevented by shifting image slightly when performing the signature imposition on the document. In addition, the job preparation station 116 allows the operator to manage and layout the document pages for final output, also known as "imposition" and "signature imposition". In addition, the operator can shuffle pages, reverse pages, insert blank pages, trim and shift pages, create bleeds and place multiple pages on a sheet, also known as "n-up" to create proof sets, brochures or pamphlets, etc. Further the job preparation station 116 permits the operator to add annotations to the document such as bates numbers, page numbers, logos and watermarks. All of these service add value to the final output. Formatting and other modifications to the document can be globally applied to the entire document, such as a shifted margin or may be applied only to select pages. Such alterations to the document are known as document/page features or attributes.

Further, these alterations are also known as document or page exceptions since they typically override specific instances of the original document formatting as set by the customer.

The next stage in the print production workflow 100 is the print production stage 108. In the print production stage 108, the final form of the documents for printing is sent to a print server 120 which will distribute the job to the final output device 122. In manual print shops, this stage 108 would be similar to an operator manually taking the ready for production job over to the desired output device 122 to start the job. The print production stage 108 manages the output resources of the print shop. Such management includes queuing jobs to the proper devices 122 in the shop, routing jobs to available devices 122, balancing the load placed on the various devices 122, and pre-processing jobs, such as splitting or RIP'ing the job, prior to sending it to a particular device 122. RIP stands for Raster Image Processor and is the hardware and/or software which converts ready for printer data into raster images. It is also a common term for rasterizing a page image on to the output media.

The print server 120 used in the print production stage 108 is coupled with the job preparation stations 116 and the network server 118 over the network 112. Further, the print server 120 is coupled with the various output devices 122 in the print shop. Note that some output devices 122 may not support electronic transfer of the data to be output and may require a manual step for operation. Such devices may include a special binding machine which requires that the partially finished documents be manually transferred to the binding machine to complete the production. The print server 120 is preferably implemented as a separate computer coupled with the network 112, however, software based print servers running on a network server 118, job preparation station 116 or store front workstation 114 may also be used. In the preferred embodiment, the printer server 120 includes an independent computer workstation, typically running a UNIX or Windows NT operating system, a software print server engine and a software print server application. The print server application offers the user interface ability to configure and manage the print server operation. The print server engine performs the automated processes of the print server. These processes include spooling and queuing jobs and job content (i.e. the document), directing the jobs to specific production output devices based on the attributes of the print job and how these attributes are satisfied by the print engine, load balancing jobs among the various production output devices to keep all printers fully utilized, e.g. to split color from black and white jobs, and acting as a communication gateway where it can accept multiple input communication and print protocols translating them to the communication and print protocol the production output device 122 understands.

The final stage of the production printing workflow 100 is the final fulfillment stage 110. The final fulfillment stage 110 is the stage where the finished output is produced on the production output device 122. A production output device is a computer output device, such as a printer, designed for high volume production of printed documents. Such devices preferably include the ability to produce large quantities of documents with mixed media types and various degrees of finishing, such as stapling or binding, at very high speed. Exemplary output devices include the Digimaster™ Digital High Volume Printer manufactured by Heidelberg Digital, L.L.C., located in Rochester, N.Y. and the NexPress™ Color printer manufactured by NexPress, Corporation, located in Rochester, N.Y.

Figure 2:
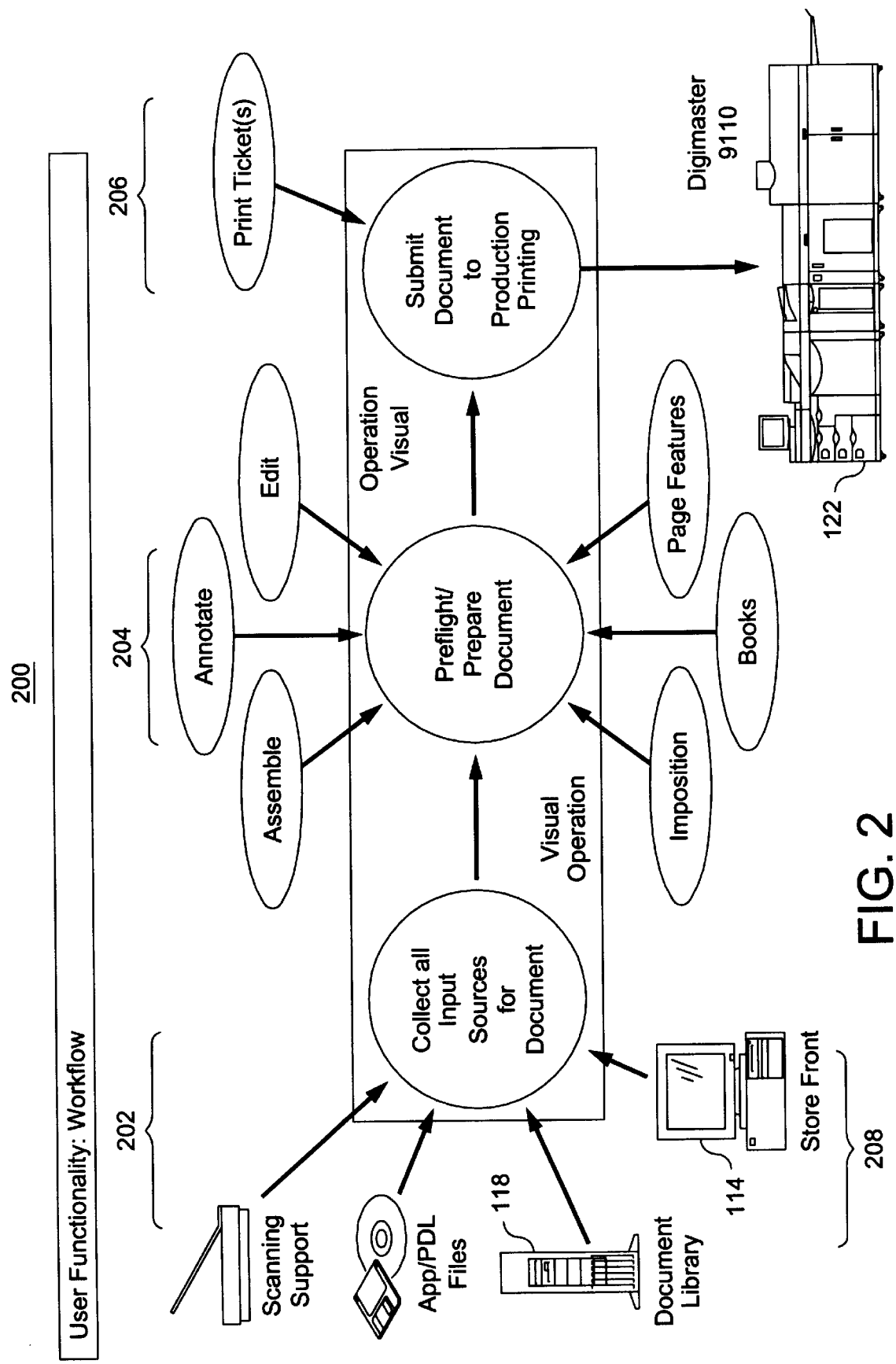
FIG. 2 depicts a flow diagram showing the user functionality workflow of the preferred embodiment

Referring now to FIG. 2, there is shown a flow diagram showing the user functionality workflow 200 of the preferred embodiment job submission and preparation stages 104, 106. The user workflow 200 includes an input source stage 202, a preflight stage 204 and a production stage 206. In the input source stage 202, all of the documents of the job are collected together from the different input sources 208. As detailed above, all of the collected documents are converted to a ready for printer format, preferably a Portable Document Format™. This conversion can be a manual or automated process or a combination thereof. For example, a special directory, can be created on the network server 118 where data files in various file formats can be placed, for example, by the clerk who accepts the documents from the customer and inputs them into the store front workstation 114. Automated logic which watches this directory, will see the placement of files and automatically convert them (or flag them for manual conversion) into a ready for printer format. Any documents which the automated logic cannot handle can be flagged for manual conversion. The converted documents are then passed to preflight stage 204 where they are prepared for production. This transfer of converted documents can occur by moving the documents to a special directory on the network server 118 where they can be accessed by the job preparation stations 116 or by transmitting the documents to the job preparation station 116. This process can be manual or automated and may involve placing the documents in a queue of documents waiting to be prepared for production. Further, this process may include a manual or automated determination of the capabilities, skill level or training level of the various operators currently logged into the available job preparation stations 116 as well as the current load/backlog of job in their respective queues. Taking these factors into account, job can be automatically or manually routed to the operator best able to handle the job both technically and in an expedient manner. This functionality can be implemented by creating an operator database which tracks the capabilities, skill level and training level of the various operators who work in the print shop. This database can be coupled with queue management software which balances the loads/backlogs of job at each station 116.

In the preflight stage 204, the documents can be assembled, such as in a book, annotated, edited, and have imposition or other page features applied. Once the documents are prepared for production, they are passed to the production stage 206. In the production stage 206, the prepared documents along with the production instructions (from the tickets) are submitted to the print server or directly to the production output device 122 using a file downloader such as the Print File Downloader™ application program manufactured by Heidelberg Digital, L.L.C., located in Rochester, N.Y. This user functionality workflow 116 may be implemented as a combination of hardware, software and manually executed components and may involve one or more of the components detailed in the production printing workflow above.

In the preferred embodiments, the user functionality workflow is preferably implemented as a workflow management software program and interface executing on the job preparation workstation 116. The preferred workflow management software is visually oriented using an object oriented graphic user interface ("GUI") approach which integrates control of the workflow functionality in a single interface. While the visual and operational appearance of the management software is object oriented, the implementation of the software may be by an object oriented programming language or a non-object oriented programming language as are known in the art.

In the GUI interface, documents, tickets and other entities and operations (collectively "objects") are visually represented on the workstation 116 display, such as with icons, tree structures and pull-down menus, and may be interacted with using known devices and methods such as utilizing a mouse or track ball to control a visually represented pointing device which is then used to click, select, drag and drop the displayed representations. Such manipulation of the visual representations results in manipulation of the underlying objects (documents, tickets, and other entities and operations). Furthermore, the GUI also permits creation and manipulation of relationships and associations among the various objects and visually displays such relationships and associations. Relationships and associations may be displayed, for example, using a hierarchical approach like a tree structure or file folder structure or using some alternate form of visual indication. It will be appreciated that graphic user interfaces are well known in the art and that there are many software development packages available which can be used to develop a GUI. One such package is the Open Software Development Kit available from Microsoft Corporation, located in Redmond, Wash.

Further, the preferred GUI utilizes a document centric approach providing a centralized viewing window for viewing documents being worked on. In the preferred embodiment, the document viewing functionality is provided by the Adobe Acrobat software program, manufactured by Adobe Systems, Inc., located in San Jose, Calif.

As was noted above, the workflow management software integrates applications which implement, control or manage the stages of the production printing workflow 100. These applications include inputting documents from various sources, document assembly including the creation and manipulation of books, document editing, document annotation, document library access on the network server 118, setting and manipulation of page features, creation and manipulation of job tickets and printing.

The workflow management software is capable of receiving input from various different sources. Such sources include hard copy originals input via a scanner, native application formats such as the Microsoft Office™ Product suite and desktop publishing applications such as QuarkXpress™, manufactured by Quark. Inc., located in Denver, Colo. and FrameMaker™, manufactured by Adobe Systems, Inc., located in San Jose, Calif. Further the software can accept Tagged Image File Format ("TIFF") documents as well as documents already in a ready for printer format such as PDF, PS or PCL. For hard copy input via a scanner, the software supports industry standard scanner interfaces, TWAIN, as defined by the TWAIN group located in Boulder Creek, Calif. and the Image and Scanner Interface Specification ("ISIS") developed by Pixel Translations, Inc., located in San Jose, Calif. and also specified via American National Standards Institute specification ANSI/AIIM MS61-1996. Using these standard interfaces, the workflow management software receives the scanned image data directly in the ready for printer format. An exemplary scanner for use with the preferred workflow software is the Imagedirect™ Scanner manufactured by Heidelberg Digital, L.L.C., located in Rochester, N.Y.

The preferred workflow management software also provides ODMA support for interfacing with document libraries. In addition, the provided ODMA support further extends the functionality of the document library to handle management, storage and archiving of compound documents (described below) and tickets. This allows libraries of standardized tickets to be created or facilitates updates and reprints of compound documents such as books.

Once documents are loaded into the workflow management software, tools are provided to perform value added services and prepare the documents for production. Assembly is the process of arranging or rearranging pages or adding or removing pages within a document. Assembly also includes imposition where page positions are forced such as when the first page of a chapter is forced to the front side of the paper. The workflow management software provides cut, copy, paste and move functionality operable on 1 or more pages. This functionality is preferably implemented via pull-down menus, pop up dialog boxes or on screen option palates or buttons as provide by the graphic user interface. In addition, the results of the respective operations are shown in a visual representation of the document in the centralized document viewing window on the job preparation station 116 display.

The workflow management software further provides support for editing and annotating the document. Tools are provided for image object area editing of a scanned page including erase inside and outside an area, cut, move, copy and paste area as well as pencil erase. Page editing tools are also provided for editing on one or more pages including area masking and cropping. Tools are also provided for annotating documents including alpha-numeric and graphic annotations. Exemplary annotations include page numbering and bates stamping. The tools further provide for placing images behind the document content, also known as watermarking. Annotation can be performed on any portion of one or more pages. For alpha-numeric annotations, the font size and style are controllable. In all cases, the results of the respective operations are shown in a visual representation of the document in the centralized document viewing window on the job preparation station 116 display. In the preferred embodiments, edits or annotations can be created or manipulated by pointing to a visual representation of the document and/or pages within the document and selecting, dragging, dropping or clicking the representation and/or selecting from a menu of options, where the selection of a particular option causes the associated edit or annotation to be applied to the specified portions of the document. Alternatively, a palate of options may be displayed from which the user may choose an option to apply to selected portions of the document. Further, the interface may provide for a dialog box or other visual control for inputting control values for the edit or annotation such as the starting number of a bates range.

The workflow management software preferably provides further support for compound documents which are documents comprised of one or more other documents, such as books comprised of chapters or course packs comprised of one or more excerpted sources . Compound documents take advantage of the object oriented nature of the workflow management software. A compound document ("CD") is a collection of one or more documents which have a particular ordering to them such as the chapters of a book. The CD further contains an automatically generated assembled document which is a single document containing the whole assembled CD. Tools are provided which allow simple management of the documents of a CD, assembly and updating of the documents into the assembled document and selective document manipulation, such as selective printing, of the documents within the CD. Tools are also provided which can interpret the content of the documents within the CD and automatically generate a table of contents in the assembled document. A compound document otherwise acts just like a document and can be edited, annotated, etc. and have tickets associated with it. Further, a compound document can contain other compound documents such as in the case of a multi-volume book. The individual documents and compound documents within the compound document further retain their independent existence and can be edited or printed independently of the CD and shared with other CD's with those edits being either automatically or manually updated into the assembled document within a particular CD. The workflow management software further displays a visual representation, such as with a hierarchical or tree structure, showing the compound document and any associated documents and tickets. In the preferred embodiments, compound documents can be created or manipulated by pointing to the visual representations of one or more documents and/or a visual representation of a CD and selecting, dragging, dropping or clicking and/or selecting from a menu of options, where the selection of a particular option causes the associated feature to be applied to the selected documents or compound documents. Alternatively, a palate of options may be displayed from which the user may choose an option to apply to selected compound documents. Further, the interface may provide for a dialog box or other visual control for inputting control values for the compound documents such as margin values. For example, a user may select one or more documents and then choose a create CD option from a pull down menu. The workflow software then creates a visual representation of the CD on the display showing the association of the CD to the selected documents. Alternatively, the user may first create a visual representation of a CD and then drag and drop the visual representations of one or more documents onto the CD visual representation. The workflow software then creates the appropriate logical associations of the data for which the visual representations represent.

The workflow management software is also preferably programmed with data about the different production output devices 122 in the print shop or otherwise available and their capabilities or other equipment, such as finishing equipment, which can be utilized either automatically or manually. The software provides tools which allow the operator to set page features/formatting which are made possible by those specific capabilities. Such page features include the plex of the document such as duplex or simplex (double sided or single sided output), binding options, such as stapling or hole punching and the availability and control settings for handling tab stock or ordered media. The preferred embodiments preferably support all of the features of the Digimaster™ line of high volume digital printers manufactured by Heidelberg Digital, L.L.C. located in Rochester, N.Y. In the preferred embodiments, these page features can be set by selecting or pointing to a visual representation of one or more pages and selecting from a menu of options, where the selection of a particular option causes the associated feature to be applied to the selected pages. Alternatively, a palate of options may be displayed from which the user may choose an option to apply to selected pages. Further, the interface may provide for a dialog box or other visual control for inputting control values for the feature such as the type of tab stock. Setting page features for specific pages encodes instructions to the production output device 122 for implementing those features within the ready for printer formatted file. When the production output device 122 receives the file for printing, it will interpret those instructions to implement the desired feature. For page features which the current device 122 cannot handle, the device 122 can signal the operator that manual intervention is required and direct the operator through the appropriate steps to implement the page feature and complete the job. This may include instructing the operator to remove partially finished documents and transfer them to a binding machine for finishing or instructing the operator to load a specific media type or tab stock into the device 122.

Tools are further provided by the workflow management software to support electronic versions of tickets for specifying production output device instructions and parameters, as well as other finishing steps which may or may not be automated, which are global to the document, e.g. job level features or global document attributes. These include such attributes as the general media type or color to use and the method of binding such as stapling. Tickets, also referred to as print tickets or job tickets, can exist independently of documents or compound documents as was mentioned above. They are independently visually represented on the display by the workflow management software. Tools are provided for manipulating tickets, such as saving, storing and associating them with documents or compound documents in addition to editing their options. In the preferred embodiments, tickets can be manipulated just like documents, using pointing, clicking, selecting, dragging and dropping. For example, a ticket can be associated with a document by selecting the ticket and dragging and dropping it on a particular document. The workflow management software then preferably visually displays the association by showing the ticket under the hierarchy of the document. Once associated, the options set by the ticket will apply to the associated document or compound document. The options represented by the ticket may be set by selecting the ticket to bring up a dialog box or pull down option menu which displays the available options and allows modification of the option values. Tickets associated with documents can be manipulated with the document. For example, saving a document save all of its associated tickets. Furthermore, the workflow management software provides the capabilities to create libraries of standardized tickets which can be used, for example, to standardize procedures across multiple franchised print shops.

Finally, the workflow management software provides tools to send the prepared documents and any associated tickets to the production output device for final production. In the preferred embodiments, documents or compound documents can be sent to a production output device by selecting, clicking or dragging the visual representation of the document or compound document to a visual representation of the print server or output device. Alternatively, the user may select an appropriate option from a pull-down menu, pop up dialog box or button palate. The workflow management software supports standard interfaces and protocols to production output devices and print servers. Further, tools are provided for managing, selecting and monitoring multiple production output devices. These tools provide visual feed back of each of the devices status to the user such as the current job queues.

Figure 3:
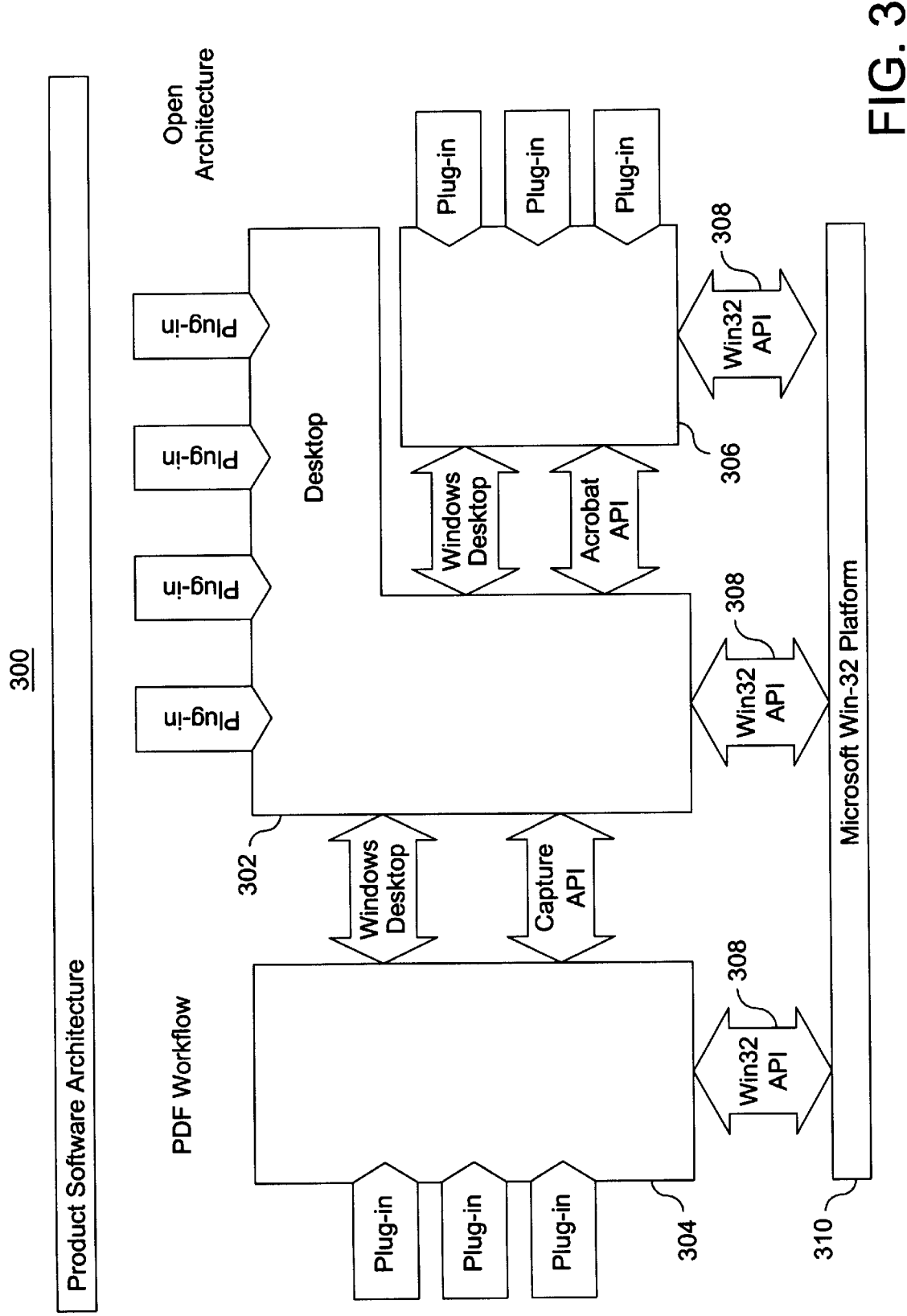
FIG. 3 depicts a block diagram of a preferred software architecture for use with the embodiments shown in FIGS. 1 and 2.

Referring now to FIG. 3, there is depicted a block diagram of a preferred software architecture 300 of a production printing workflow management application. The architecture 300 includes a desktop component 302, a workflow component 304 and a viewer component 306. All of the components execute via application program interfaces 308 on a the job preparation station 116 which is, as discussed above, preferably a 32 bit Microsoft Windows™ (95, 98, 2000, etc.) or Windows NT™ based platform 310.

Central to the architecture 300 is the desktop component 302 ("desktop"). The desktop 302 integrates the viewer 306 and workflow 304 components together. The desktop 302 implements the integrated GUI interface and provides all of the workflow functionality and visual representations described above to be displayed on the job preparation station 116 display. The desktop 302 is preferably structured as a plug in architecture. A plug in architecture allows enhancements and updates to be incorporated into the desktop in a simple and efficient manner and without requiring recompilation of the main program code which implements the desktop. The main program code is designed to look for small enhancement programs ("plug ins") each time the code is executed. If one or more plug ins are found, their functionality is incorporated into the main program code through a plug in interface. A plug in may contain a new feature or function or may modify an existing feature or function. By not requiring recompilations, enhancements can be distributed to users who can easily update their own software simply by placing the plug in the correct location on their computer system. From the user's perspective, upon loading of the desktop 302, a complete desktop 302 containing both old and new functionality is seamlessly presented. In the preferred embodiments, the desktop 302 is preferably implemented using an object oriented programming language which implements the object oriented nature of the GUI. Such languages include C++ or Java and may utilize Microsoft Corporations Open Software Development Kit. Alternatively, a non-object oriented programming language may also be used.

The viewer component 306 ("viewer") provides the functionality for viewing documents and pages within documents and preferably operates on documents formatted in a ready for printer format. Further the viewer 306 provides the ability to assemble, edit and annotate at the page level of the document as well as set page features for individual or groups of pages. In the preferred embodiment, the viewer component is implemented using the Adobe Acrobat™ version 4.05 manufactured by Adobe Systems, Inc. located in San Jose, Calif., which utilizes the Portable Document Format™ ready for printer format. The viewer is coupled with desktop via standard Microsoft Windows interfaces and the Acrobat application program interface, as defined in the Adobe Acrobat Software Development Kit available from Adobe Systems in San Jose Calif. The viewer 306 is also preferably implemented as a plug in architecture which allows additional enhancements to be added. Such additional enhancement plug ins may be used to add one or more of the page level assembly, editing and annotation functions described above. Such plug-ins include Quite Imposing Plus™ manufactured by Quite, Inc., located in London, United Kingdom for performing the various imposition functions disclosed above and StampPDF™ manufactured by Digital Applications, Inc., located in Lansdowne, Pa. for performing various annotation functions disclosed above. Alternatively, viewers 306 which utilize non-ready for printer formats, such as TIFF formats can also be used. However, such viewers 306 typically have reduced feature sets and limited ability to perform assembly such as imposition, editing or annotation functions due to the fixed nature of the TIFF data format.

The viewer 306 is coupled with the desktop 308 so as to provide interoperability of functions and facilitate the workflow. In particular, the desktop 302 visually represents objects which the viewer 306 may be displaying. Further, the user selection and manipulation of documents, tickets or other objects in the desktop 302 are appropriately transmitted to the viewer 306 for display. For example, when a user selects a document on the desktop 302 for viewing, information about the selection is passed to the viewer 306 so that the selected document can be loaded and displayed. The desktop 302 also provides for data transfer between documents displayed in the viewer 306. For example, where a user selects a page from a document in the viewer 306, copies that page and then selects another document from the desktop 302 to paste the copied page into. The desktop 302 facilitates this "clip board" functionality between the documents. Further, edits, annotations or the addition of other page features using the functionality of the viewer 306 may cause data to be passed to the desktop 302 so that these edits, annotations or additional page features can be visually represented and noted with the documents they apply to. For example, addition of a page feature to a document, such as setting the plex, may cause a page object, i.e., a visual representation of the existence of a page feature, to be created and associated with the document object, i.e., the visual representation of the document on the desktop 302. The association may appear as a hierarchical structure on the desktop 302 such as a tree structure.

The workflow component 304 is also coupled with the desktop 302. The workflow component 304 provides tools and functionality for managing the production printing workflow of particular documents or compound documents. The workflow component 304 provides for creation and/or definition of a workflow object which can be visually represented on the desktop 302 and manipulated using the desktop 302 functionality, as described above, just like other objects such as documents, compound documents or tickets. The workflow object can be defined to contain the procedural stages that a document must go through to be finally produced. When the workflow object is associated with a document or compound document, such as by drag and drop using the GUI of the desktop 302, each of the defined procedural stages is then performed. For example, one of the procedural stages could be the creation of a ticket. If a document that has no ticket is dropped on this workflow object, the operator is then guided through the creation and association of a ticket for the document. Workflow objects can be defined to guide an operator through or automatically perform a series of procedural steps. They can be used to standardize and automate routine procedures in the print shop and eliminate inconsistencies and inefficiencies in the production printing workflow. Workflow objects can exist independently of documents, compound documents or tickets or can be associated with them. Such associations can be visually represented in the hierarchical format as described above.

The workflow component 304 is preferably also implemented as a plug-in architecture to facilitate enhancements. One exemplary workflow component 304 which can be used with the disclosed embodiments is the Adobe Capture™ program version 3.0 manufactured by Adobe Systems, Inc. located in San Jose, Calif. In an alternative embodiment, the workflow component 304 is a standalone workflow management interface, providing its own graphic user interface for managing and manipulating workflow objects and their relationships with documents, compound documents and tickets.

Figure 4B:
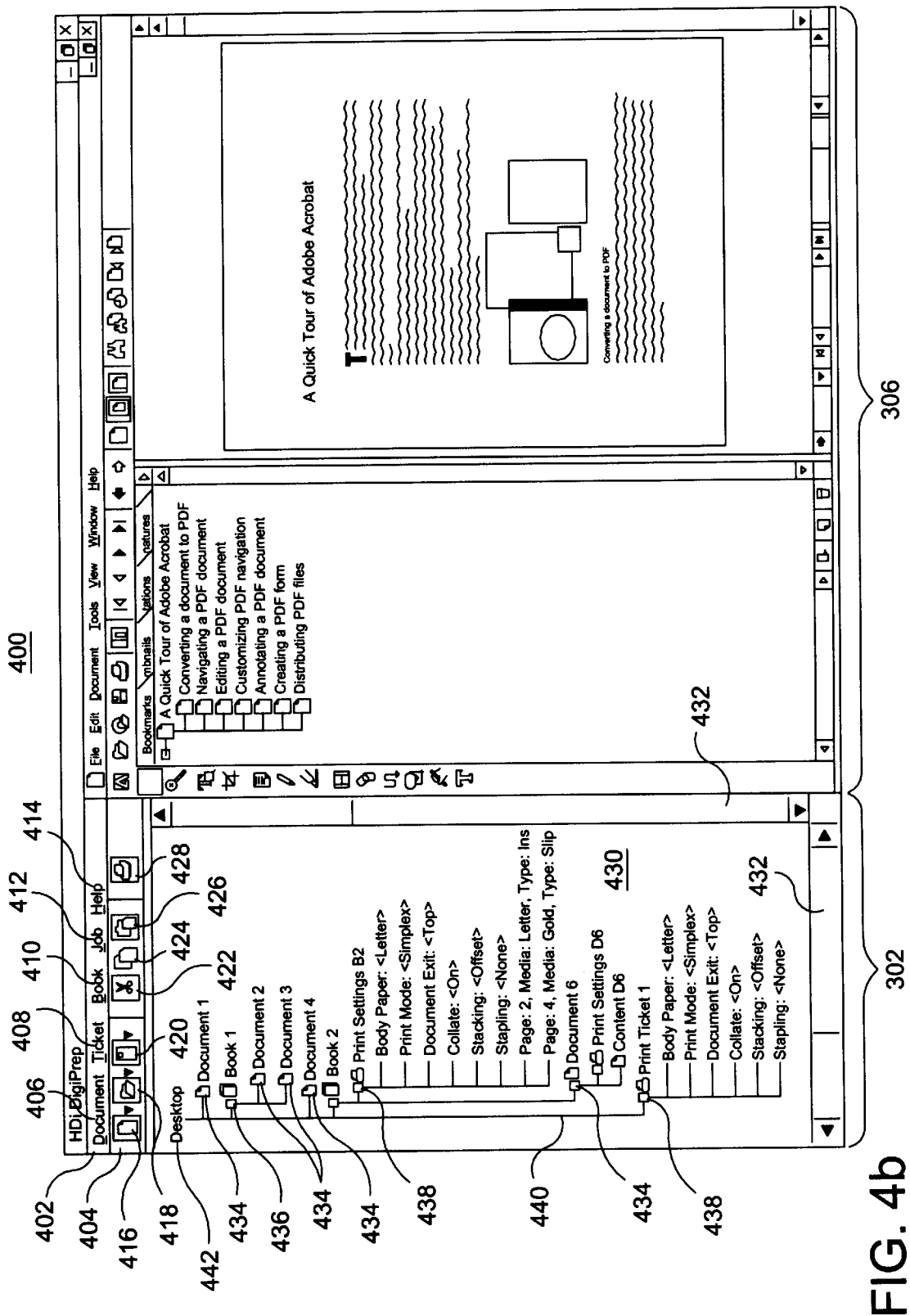
FIG. 4 depicts a representation of a graphic user interface display according to the preferred embodiment.

Referring now to FIG. 4, there is shown a representation of a graphic user interface display 400 according to the preferred embodiment. The display 400 includes viewer 306 and desktop 302 components. The desktop component 302 includes menus 402 and button palates 404 which allow the user to visually manage and manipulate the various objects described above. The menus 402 include a document menu 406, a ticket menu 408, a book menu 410, a job menu 412 and help menu 414. The button palate 404 includes a new object button 416, an open button 418 and a library access button 420. The button palate 404 further includes a cut button 422, a copy button 424, a paste button 426 and a print button 428. It will be appreciated that graphic user interfaces are well known in the art and there are many ways to implement a GUI and therefore, all forms of graphic input devices, including tear off menus, floating button palates, dialog boxes, alternate keyboard command and mouse short shortcuts and alternative physical input devices are all contemplated.

The document menu 406 provides options for creating and manipulating document objects within the workflow software environment. Such options may include creating a document, opening a document, closing a document, opening an ODMA interface to a document library, viewing a document in the viewer component, moving a document, printing a document and deleting a document. The ticket menu 408 provides options for creating and manipulating job/print tickets. Such options may include creating a ticket, accessing a database of tickets, viewing and setting the features/attributes controlled by a ticket, moving a ticket, deleting a ticket and associating a ticket with a document or book. The book menu 410 provides options for creating and manipulating compound document objects. Such options may include creating a book, associating or disassociating documents with a book, associating or disassociating a ticket with a book or document within a book, generating the assembled document from all of the associated component documents, generating a table of contents for the book, updating the assembled document with updates made to individual component documents, printing a book or selectively printing subsections of a book. The job menu 412 provides options for creating and manipulating jobs which, as noted above, are documents or compound documents and associated job/print tickets. Such options may include creating a job, editing a job, moving a job, printing a job and deleting a job. The help menu 414 provides options for assisting the user with operation of the software.

The new object button 416 implements functionality to create a new document, ticket, compound document or job object and preferably, selection of this button causes a dialog box presenting various related options to be presented to the user. The open button 418 implements functionality to open an existing document, compound document, ticket, job or document library and preferably, selection of this button causes a dialog box to be presented which allows the user to locate files and manage the file system of the job preparation station 116 or network server 118. The cut button 422, copy button 424, and paste button 426 implement functionality for moving and duplicating selected objects visually displayed by the desktop 302 as is known in the art. These buttons are coupled with a temporary storage area, also known as "clipboard" through which the cut, copy and paste functionality is implemented. The print button 428 implements the functionality of sending selected document or compound documents to the production printer device. This button preferably causes a dialog box to be displayed to the user which acts as the interface between the desktop 302 and the print server 120 and production output devices 122. This interface may allow last minute overrides to the output options prior to final production. Preferably, this button invokes the Print File Downloader™ application manufactured by Heidelberg Digital, L.L.C., located in Rochester, N.Y. It will be appreciated that options and functions can be implemented either as a button or menu option and that the preferred workflow software can work with any arrangement. It is preferred, however, that any arrangement of buttons, menus, etc. be arranged in an ergonomic and intuitive arrangement which minimizes the operator's training time and reduces the opportunities for operator error.

The desktop component 302 further includes a hierarchical display window 430. FIG. 4 further shows an exemplary hierarchical display window 430 showing a representative collection of objects and associations. This window 430 includes standard windowing control as are known in the art such as scroll bars 432. The window 430 further includes a representation of a hierarchy under which all of the represented objects are arranged. The exemplary window 430 includes a desktop object 442 representing the underlying database of objects, document objects 434, book objects 436 and ticket objects 438 all associated in tree structure 440. The tree structure represents the logical underlying associations between the data which the objects 434, 436 and 438 represent. For example, the book object 436 labeled "Book 1" contains document objects 434 labeled "document 2" and "document 3". The book object 436 labeled "Book 2" contains a ticket object 438 labeled "print settings B2" and a document object 434 labeled "Document 6" which itself contains a ticket object 438 labeled "print settings D6". Further, the document 434 labeled "Document 1" is not associated with any other objects. In addition, objects can "expanded" or "collapsed" to show or hide their attributes or other objects lower in their hierarchy. For example, page objects representing page features specified for selected pages within a document can appear underneath the hierarchy of the specific document to visually indicate their existence to the operator. Selecting the page object permits the operator to edit, view or otherwise manipulate that page feature. A page object can exist for each page feature specified for a given document.

Figure 5:
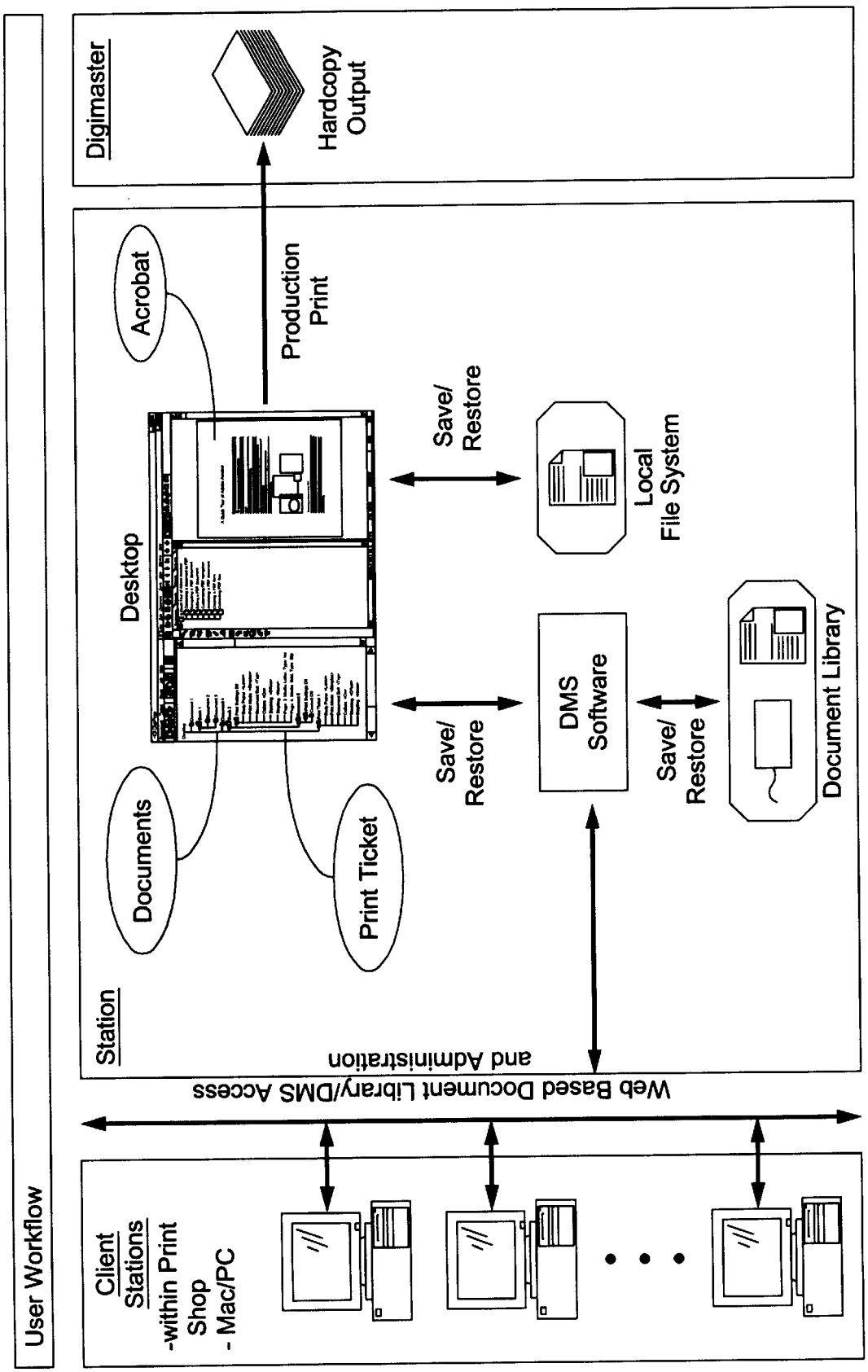
FIG. 5 depicts a high level representation of the integration of the preferred embodiment in the workflow of the print shop.
Figure 6:
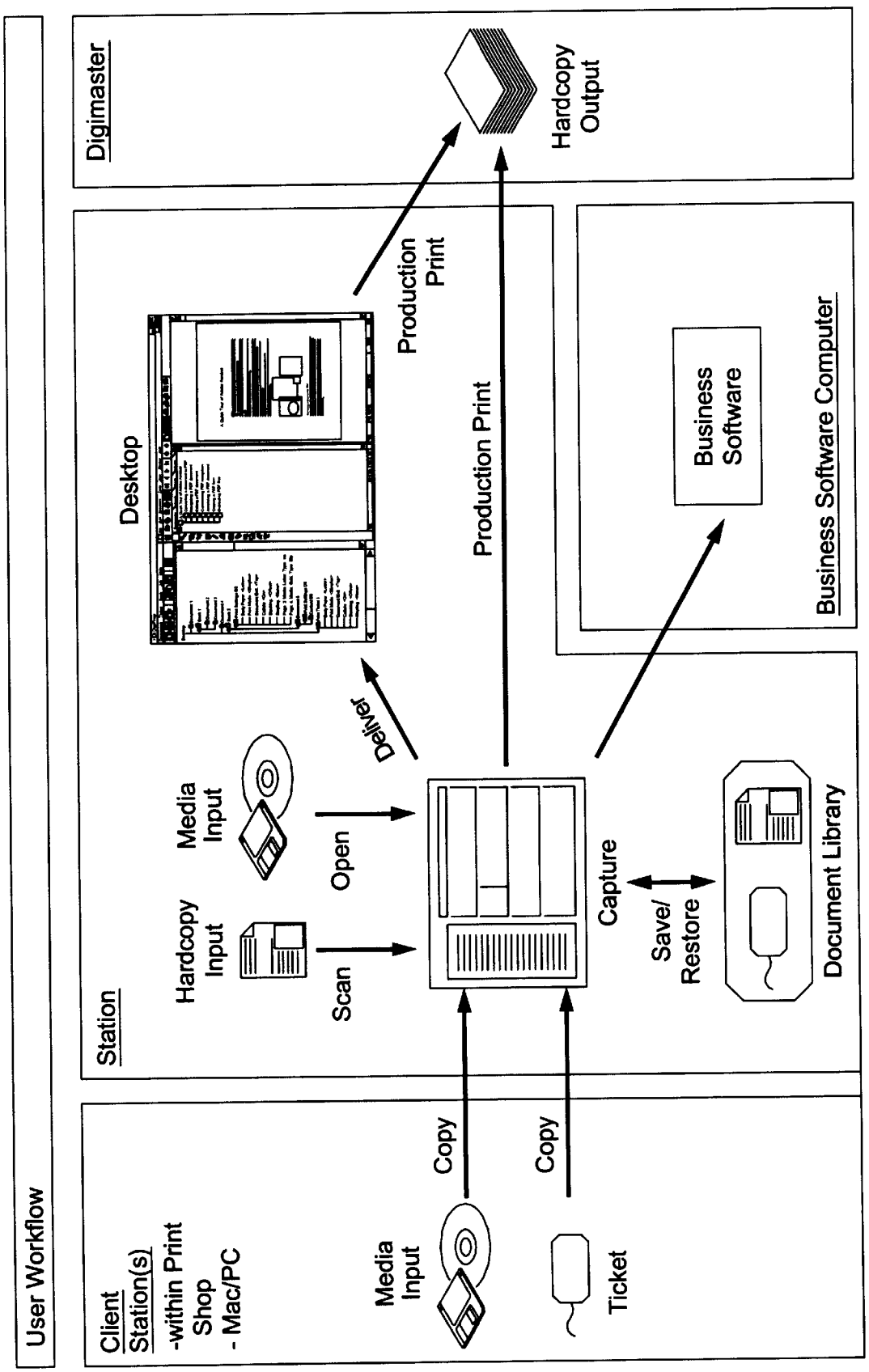
FIG. 6 depicts a high level representation of the integration of the preferred embodiment in the workflow of the print shop including a workflow automation component.

The display window 430 provide an intuitive and visual representation of the work that has to be managed and completed on the particular job preparation station 116. The operator can manage and prepare multiple different documents or jobs and keep everything organized in a simple and efficient manner. FIG. 5 shows a high level representation of the integration of the workflow management software described above in the workflow of the print shop. FIG. 6 shows an alternative high level representation of the integration of the workflow management software in the workflow of the print shop including the workflow component 304 for automating and standardizing the procedural steps within the workflow.

In alternative embodiments, or in addition to and as an extension of the above disclosed functionality, other features can also be provided such as page tickets, mobile page features, visual page features, and efficient use of production output resources. Page tickets are similar to job tickets except that they contain one or more page objects, each of which holds a particular page feature or attribute and the settings for that feature or attribute. The page ticket acts like a portable container for various page formatting features and attributes, which are described in more detail above. The page ticket provides a convenient and efficient method of applying one or more page features to a page or range of pages in a document. The printing workflow management software provides functionality for visually representing page tickets on the desktop 302 just like other objects and provides for creating, manipulating and associating page tickets documents or compound documents. In a preferred embodiment, an operator can apply the page features contained within a page ticket by simply dragging and dropping the page ticket from the desktop 302 to a selected page or range of pages in the viewer 306. This action causes all of the page features within the page ticket and their respective settings to be applied to the selected pages. For example, a page ticket can be defined which sets adjusts a left margin for binding purposes, sets the color of the paper to be used to blue, and defines that the page is to be three hole punched. Instead of having to define each of these features individually for the desired pages, they can be defined once in a page ticket and then dropped on the selected pages. This allows creation of page ticket libraries which contain a standardized page tickets, each containing combinations of page features that are commonly used. In the preferred embodiments, dropping the page ticket on a document or CD will cause creation of page objects representing the respective page features to be created in that document's or CD's hierarchy in addition to the actual application of those features to the pages of the document or CD as described above. It will be appreciated that the functionality of page tickets can exist and be implemented independently of an object oriented user interface.

In another alternative embodiment, mobile page features are implemented. Typically, a page feature is associated with a particular page number in a document and not associated with the page itself. If the page is copied to another location in the same or a different document, the defined page features may not follow. By implementing mobile page features, the page features stick to the page and follow it where ever it goes. Mobile page features are implemented by embedding them within an unused portion of the ready for printer format code. Preferably this is done using an extensible markup language ("XML") as defined in the XML 1.0 Specification produced by the W3C XML Working Group, REC-XML-0210. In the preferred embodiment, while the page features are actually separate from the document itself, they are still independently visually represented on the desktop 302 as page objects within the particular document's hierarchy so as to provide an intuitive indication of that feature's existence as well as intuitive access to the feature or editing and manipulation. It will be appreciated, however, that the functionality of mobile page features can be implemented independently of an object oriented user interface.

In yet another alternative embodiment, the application of particular page features or document features are visually represented in the viewer 306. For example, application of a page feature for three hole punching would cause visual representations of the holes in the pages to appear on the visual representation of the selected pages. This would allow the operator to see the results of the page feature and determine, for example, if the body text of the page is too close to the holes. While the page or document features are visible in the viewer, they are inserted in the ready for printer format code so as not to actually print out when the document is sent to the production output device. Preferably, the logic which implements the visual representation of the page and document features knows of the capabilities and operations of the selected production output device. For example, the logic knows that the automatic stapler in one production output device staples along the left edge of the paper while another production output device staples along the top edge. The logic then knows, for a particular selected production output device, where to display the staple when the user applies a stapling page feature.

In still another embodiment, functionality is included in the workflow management software to make efficient use of different production output devices with differing capabilities needed for a given job and different operating costs. Such differing capabilities include the ability to print in color or black and white, the ability to print at very high resolution or on oversize paper stock. For example, there is a growing use of combining color pages with black and white ("B&W") pages in the same document as a final printed product. This combination of B&W and color pages in a single document brings constraints on the production output device for producing the printed output. If this single document is sent to a color printing device, it will be printed, but at a very high cost since color printing is typically more expensive than B&W printing. If sent to a B&W printing device, the job will be printed at reasonable cost but the color pages will not be produced in color. Another alternative is to manually split the job into two separate jobs, sending the color pages to the color printer and the B&W pages to the B&W printer and then collate the output of each printer into the final product. This becomes a complicated process when the customer desires a high volume of finished product. Further, the insertion of manual collation steps makes it difficult to take advantage of automated finishing systems.

In a preferred embodiment, the operator is given the opportunity to flag pages in the document for production on specific output devices or resources at the job preparation stage by setting a specially defined page attribute associated with the particular page. The attribute indicates the desired or necessary capabilities of the production output device in order to produce that page with the intended results. For example, the attribute can indicate that a production output device with color capability is desired or needed. This allows the operator to determine and optimize specific pages to take advantage of the capabilities of the different production output devices available. Typically, the majority of the document will be produced on one device with a small subset of pages needing to be diverted to a different device, e.g. a small number of color pages within a large black and white document. The operator further defines which pages are part of the main body of the document and which are the exceptions to be produced separately.

When the job is submitted to the print server, the print server detects the flags/attributes and appropriately and automatically diverts the pages to their appropriate production output device. The print server includes a receiver which receives the document and passes the document to a resource allocator logic which reads the pages and interprets the special page attribute. The resource allocator can be implemented in software, hardware or a combination thereof. The resource allocator is programmed to know about the different output resources/devices available to the shop (inside or outside via network for example) and their corresponding capabilities. The resource allocator interprets the special attribute and then attempts to match an appropriate output resource that has the desired or necessary capability to produce that particular page. The resource allocation can be completely automated or manual or a combination thereof.

If a particular capability is desired or necessary but that capability is not available on any of the print resources in the shop or there is too big a queue for the particular resource, the resource allocator can make a determination, either automatically or with manual operator intervention, of how best to print that particular page. Further, the resource allocator can include "policies" or pre-defined rules for handling particular capability "requests". A policy can be implemented to force the whole document to print on a particular resource, ignoring the special attribute of those pages with the attribute set. In addition, a policy can be set to always "satisfy the capability request" and route pages to resources with the desired capability. Further, a policy can be set to request manual operator intervention when a page with a specially requested capability passes through the resource allocator to have the operator determine the best course of action. Once the print resource for the page is determined, the page is passed to a distribution engine which transmits the page to the print resource for final output.

When printing the pages, the print server will stall the main body of the document while the exception pages are produced on the alternate output device. The print server then indicates to the operator to retrieve the exception output and place it in the collating apparatus or document assembler of the printing device which will be used to print the main body. Once this is complete, the print server sends the main body to the production device and, in addition, where a exception page was located, the print server instructs the production device to collate or assemble from the exception output the requisite finished page. This results in a complete finished product with minimal operator intervention. It will be appreciated that numerous alternatives can be used such as a mechanical link between the production output devices which transfers the finished output of one device to the auto-collator/assembler of another device for collating/ assembling back into the main document. Further now that the finished document is contained within one production output device, in-line finishing equipment, such as staplers or other binding equipment, can be used to produce the final output.

It is therefore intended that the foregoing detailed description be regarded as illustrative rather than limiting, and that it be understood that it is the following claims, including all equivalents, that are intended to define the spirit and scope of this invention.

We claim:

1. An interface, implemented in a computer, for representing and controlling a production printing workflow comprising:
    a display;
    a first document object representing a document, said document further comprising content and formatting, said formatting defining at least one page in said document, said first document object being associated with a first visual representation on said display;
    a document ticket object representing global document attributes, said document ticket object being associated with a second visual representation on said display and capable of being associated with said first document object;
    a page object representing a page attribute of one of said at least one page, said page object being associated with a third visual representation on said display and capable of being associated with said first document object; and
    a first user input device for selectively associating at least two of said first, second and third visual representations;
    wherein association of said first, second and third visual representations results in association of said respective objects.

2. The interface of claim 1, wherein said interface further comprises a graphic user interface.

3. The interface of claim 1, wherein said first user input device comprises a pointing device.

4. The interface of claim 1, wherein associations of said first, second and third visual representations are visually represented on said display.

5. The interface of claim 4, wherein said associations are represented on said display in a hierarchical format.

6. The interface of claim 1, wherein associations of said first, second and third visual representations comprise visual associations.

7. The interface of claim 1, wherein association of said first document object, said page object and said document ticket object comprise logical associations.

8. The interface of claim 1, wherein said association of said document ticket object with said first document object is operative to cause said global document attributes to apply to said document in said first document object.

9. The interface of claim 1, wherein said association of said page object with one of said at least one page in said document in said first document object is operative to cause said page attributes to apply to said one of said at least one page.

10. The interface of claim 1, further comprising:
    a job object representing an association of at least one of said first document object and at least one of said document ticket object, said job object being associated with a fourth visual representation on said display.

11. The interface of claim 10, wherein said job object further represents an association of said at least one of said first document object and said at least one of said document ticket object with at least one of said page object.

12. The interface of claim 10, wherein said job object further comprises job attributes operative to control document production.

13. The interface of claim 10, wherein user manipulation of said fourth visual representation also manipulates said associated objects.

14. The interface of claim 13, wherein said user manipulation includes an action selected from the group consisting of cutting, copying, pasting, storing, deleting and printing.

15. The interface of claim 1, further comprising:
    a workflow object representing a ordered series of document production acts, said workflow object being associated with a fourth visual representation on said display and capable of being associated with said first document object.

16. The interface of claim 15, wherein said workflow object is further capable of being associated with an association of said first document object and said document ticket object.

17. The interface of claim 15, wherein an association of said workflow object with said first document object causes execution of said document production acts with respect to said document in said first document object.

18. The interface of claim 1, wherein said page attribute includes attributes selected from the group consisting of annotation, imposition, media type, media source, media characteristics, plex, binding and masking.

19. The interface of claim 1, wherein said global document attributes include attributes selected from the group consisting of annotation, imposition, media type, media source, media characteristics, plex, binding and masking.

20. The interface of claim 1, further comprising a second user input device for creating said page object, said second user input device operative to allow selection of said page attribute, setting of a value of said page attribute and selection of one or more of said at least one page in said document to apply said page attribute to wherein upon application, one or more of said page objects are created and associated with each of said one or more of said at least one page and said corresponding document object.

21. The interface of claim 20, wherein said second user input device comprises a menu represented on said display and coupled with said first user input device.

22. The interface of claim 20, wherein said second user input device comprises a dialog box represented on said display and coupled with said first user input device.

23. The interface of claim 20, wherein said second user input device is further operative to allow said selecting by drag and drop of said third visual representation on a fourth visual representation of said one or more of said at least one page.

24. The interface of claim 1, wherein said document is encoded in a ready for printer format.

25. The interface of claim 24, wherein said ready for printer format is a format selected from the group consisting of Portable Document Format, PostScript and Printer Control Language.

26. An interface, implemented in a computer, for representing and controlling a production printing workflow comprising:
- a display;
- a first document entity representing a document, said document further comprising content and formatting, said formatting defining at least one page in said document, said first document entity being associated with a first visual representation on said display;
- a document ticket entity representing global document attributes, said document ticket entity being associated with a second visual representation on said display and capable of being associated with said first document entity;
- a page entity representing a page attribute of one of said at least one page, said page entity being associated with a third visual representation on said display and capable of being associated with said first document entity; and
- a first user input device for selectively associating at least two of said first, second and third visual representations;
- wherein association of said first, second and third visual representations results in association of said respective entities.

27. The interface of claim 26, wherein said interface further comprises a graphic user interface.

28. The interface of claim 26, wherein said first user input device comprises a pointing device.

29. The interface of claim 26, wherein associations of said first, second and third visual representations are visually represented on said display.

30. The interface of claim 29, wherein said associations are represented on said display in a hierarchical format.

31. The interface of claim 26, wherein associations of said first, second and third visual representations comprise visual associations.

32. The interface of claim 26, wherein association of said first document entity, said page entity and said document ticket entity comprise logical associations.

33. The interface of claim 26, wherein said association of said document ticket entity with said first document entity is operative to cause said global document attributes to apply to said document in said first document entity.

34. The interface of claim 26, wherein said association of said page entity with one of said at least one page in said document in said first document entity is operative to cause said page attributes to apply to said one of said at least one page.

35. The interface of claim 26, further comprising:
- a job entity representing an association of at least one of said first document entity and at least one of said document ticket entity, said job entity being associated with a fourth visual representation on said display.

36. The interface of claim 35, wherein said job entity further represents an association of said at least one of said first document entity and said at least one of said document ticket entity with at least one of said page entity.

37. The interface of claim 35, wherein said job entity further comprises job attributes operative to control document production.

38. The interface of claim 35, wherein user manipulation of said fourth visual representation also manipulates said associated entities.

39. The interface of claim 38, wherein said user manipulation includes an action selected from the group consisting of cutting, copying, pasting, storing, deleting and printing.

40. The interface of claim 26, further comprising:
- a workflow entity representing a ordered series of document production acts, said workflow entity being associated with a fourth visual representation on said display and capable of being associated with said first document entity.

41. The interface of claim 40, wherein said workflow entity is further capable of being associated with an association of said first document entity and said document ticket entity.

42. The interface of claim 40, wherein an association of said workflow entity with said first document entity causes execution of said document production acts with respect to said document in said first document entity.

43. The interface of claim 26, wherein said page attribute includes attributes selected from the group consisting of annotation, imposition, media type, media source, media characteristics, plex, binding and masking.

44. The interface of claim 26, wherein said global document attributes include attributes selected from the group consisting of annotation, imposition, media type, media source, media characteristics, plex, binding and masking.

45. The interface of claim 26, further comprising a second user input device for creating said page entity, said second user input device operative to allow selection of said page attribute, setting of a value of said page attribute and selection of one or more of said at least one page in said document to apply said page attribute to wherein upon application, one or more of said page entities are created and associated with each of said one or more of said at least one page and said corresponding document entity.

46. The interface of claim 45, wherein said second user input device comprises a menu represented on said display and coupled with said first user input device.

47. The interface of claim 45, wherein said second user input device comprises a dialog box represented on said display and coupled with said first user input device.

48. The interface of claim 45, wherein said second user input device is further operative to allow said selecting by drag and drop of said third visual representation on a fourth visual representation of said one or more of said at least one page.

49. The interface of claim 26, wherein said document is encoded in a ready for printer format.

50. The interface of claim 49, wherein said ready for printer format is a format selected from the group consisting of Portable Document Format, PostScript and Printer Control Language.

51. A method of controlling a production printing workflow comprising:
(a) displaying, on a display, a first visual representation of a first document object representing a document on a display;
(b) displaying, on said display, a second visual representation of a document ticket object representing global document attributes capable of being associated with said document;

(c) selectively associating said first visual representation with said second visual representation; and (d) based on (c), linking said global document attributes with said document such that said global document attributes apply to said document.

52. The method of claim 51, wherein said document further comprises one or more pages, said method further comprising:

(e) displaying, on said display, a third visual representation of a page object representing page attribute capable of being associated with one of said one or more pages;

(f) selectively associating said third visual representation with said first visual representation; and (g) based on (f), linking said page attribute with a corresponding one of said one or more pages such that said page attribute applies to said corresponding one of said one or more pages.

53. The method of claim 52, wherein said page attribute includes attributes selected from the group consisting of annotation, imposition, media type, media source, media characteristics, plex, binding, and masking.

54. The method of claim 51 further wherein (c) further comprises dragging and dropping said second visual representation on said first visual representation.

55. The method of claim 51 further comprising:

(e) based on (c), displaying a third visual representation of said association.

56. The method of claim 55, wherein said third visual representation comprises a hierarchical display.

57. The method of claim 51 further comprising:

(e) displaying a third visual representation of a set of procedures to be performed on said document on said display;

(f) selectively associating said first visual representation with said third representation; and (g) based on (f); performing said set of procedures on said document.

58. The method of claim 51, wherein said document is encoded in a ready for printer format.

59. The method of claim 58, wherein said ready for printer format is a format selected from the group consisting of Portable Document Format, PostScript and Printer Control Language.

60. The method of claim 51, wherein said (a)–(d) are implemented using a graphic user interface.

61. The method of claim 60, wherein said graphic user interface is object oriented.

62. A system for interfacing to and controlling a production printing workflow:

means for receiving content and formatting instructions for formatting said content, said formatting instructions comprising instruction means for sub-dividing said content into one or more pages;

means for receiving output instructions for controlling output of said content to an output device;

means for representing said content and said formatting instructions on a display as a first manipulatable object;

means for representing said output instructions on said display as a second manipulatable object;

means for selectively associating said first manipulatable object with said second manipulatable object to associate said output instructions with said content and formatting instructions; and means for representing said association on said display as a third manipulatable object.

63. The system of claim 62, further comprising:

means for receiving individual page formatting deviation instructions for controlling the formatting of one of said one or more pages;

means for representing said individual page formatting deviation instructions on said display as a fourth manipulatable object; and means for selectively associating said fourth manipulatable object with said first manipulatable object to associate said individual page formatting deviation instructions with said one or more pages.

* * * * *